United States Patent [19]

Mollen et al.

[11] 3,839,919

[45] Oct. 8, 1974

[54] RIDING MOWER

[75] Inventors: Ignatius J. Mollen, Brillion; Phillip E. Koerper; Albert G. Turner, both of Brookfield; David S. Dewhurst, Wauwatosa, all of Wis.

[73] Assignee: Ariens Company, Brillion, Wis.

[22] Filed: Oct. 30, 1972

[21] Appl. No.: 302,177

Related U.S. Application Data

[62] Division of Ser. No. 132,402, April 8, 1971, abandoned.

[52] U.S. Cl. ................................................ 74/197
[51] Int. Cl. ............................................ F16h 15/08
[58] Field of Search ..................................... 74/197

[56] References Cited
UNITED STATES PATENTS

| | | | |
|---|---|---|---|
| 1,455,704 | 5/1923 | Blakoe | 74/194 |
| 1,861,303 | 5/1932 | Yarman | 74/194 |
| 3,580,351 | 5/1971 | Mollen | 74/194 X |
| 3,613,814 | 10/1971 | Prien, Jr. | 74/194 X |

*Primary Examiner*—Leonard H. Gerin
*Attorney, Agent, or Firm*—Wheeler, Morsell, House & Fuller

[57] ABSTRACT

A wheeled frame with tilting front axle has rack and pinion steering gear. A rear mounted prime mover with vertical shaft has separate pulleys for driving the vehicle through a friction disk rate changer and for driving the shaft of the centrally mounted mower.

The mower is bodily movable fore and aft for tightening the drive belt or relaxing it to interrupt the drive to the mower. The pan which houses the rotary mower can be adjusted vertically and can move vertically independently of adjustment without interfering with, or being affected by, the clutching fore and aft movement.

2 Claims, 7 Drawing Figures

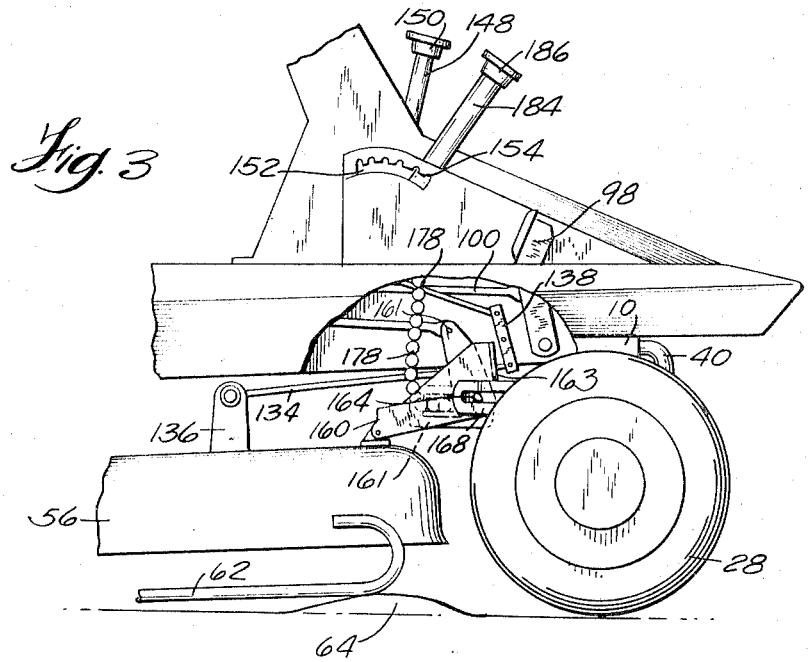
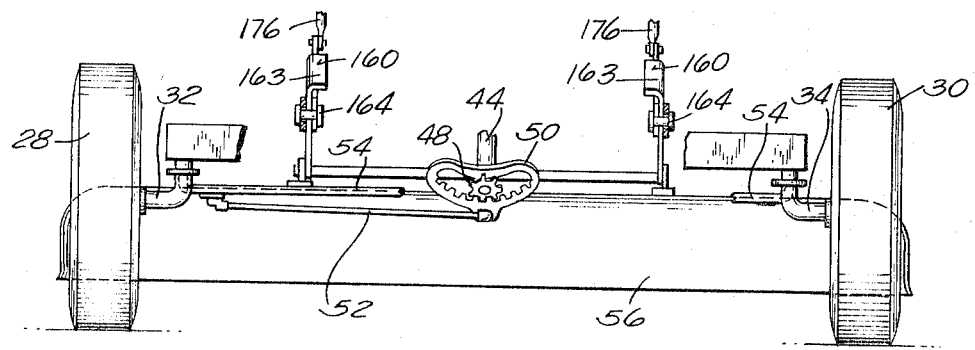
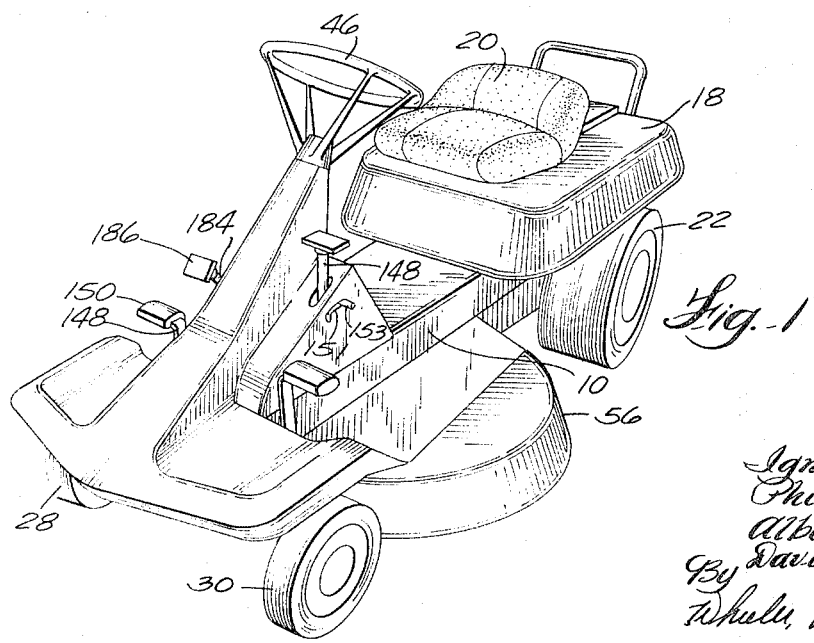

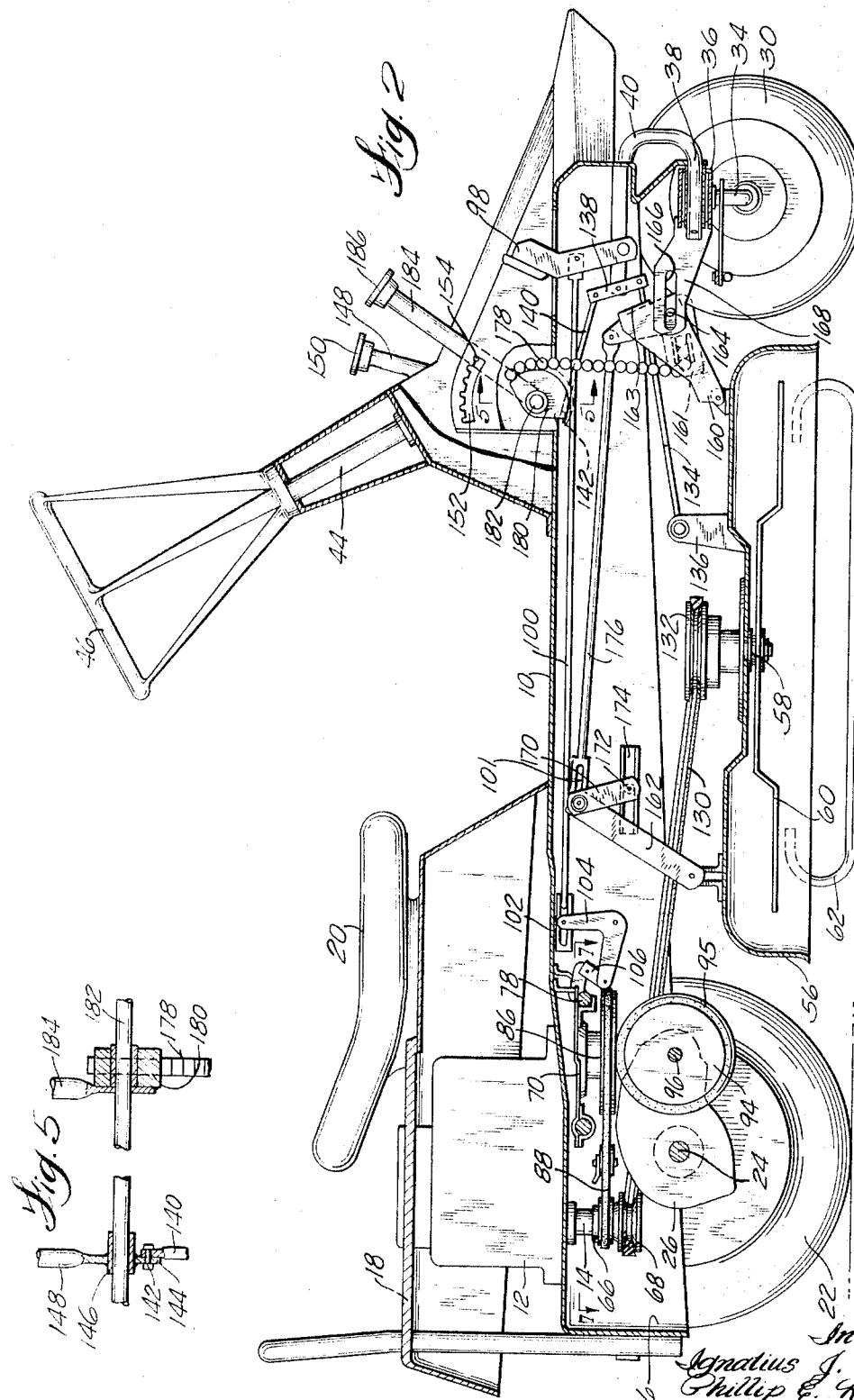

RIDING MOWER

This is a division of application Ser. No. 132,402 filed 4-8-71, now abandoned.

BACKGROUND OF INVENTION

Past attempts to provide riding mowers with the various controls and adjustments of the instant device have involved mechanical organization much more complex than that herein disclosed.

SUMMARY OF INVENTION

The drive is varied in ratio by unclutching the driving disk and moving it in its own plane across the rim of the driven disk between various forward and reverse driving positions.

At the same time, the drive to the rotary blade of the mower may be engaged and disengaged when the belt from that shaft to the mower is tightened or declutched by bodily movement of the mower beneath the frame of the riding vehicle. Means is also provided for adjusting the blade vertically without interfering with bodily movement thereof for belt tightening and releasing purposes, independent movement of the pan also being accommodated when irregular ground is traversed.

Individually dirigible front wheels are at the ends of a tiltable axle and have steering link connection actuated from the steering wheel of the vehicle by a rack and segmental gear.

BRIEF DESCRIPTION OF DRAWINGS

FIG. 1 is a small scale view of the riding mower in perspective.

FIG. 2 is a view thereof on a larger scale in longitudinal section.

FIG. 3 is a fragmentary side elevation of the forward portion of the riding mower, parts being broken away.

FIG. 4 is a fragmentary front elevation of the front axle.

FIG. 5 is a detail view in section on line 5—5 in FIG. 2.

DETAILED DESCRIPTION

Figure 7:
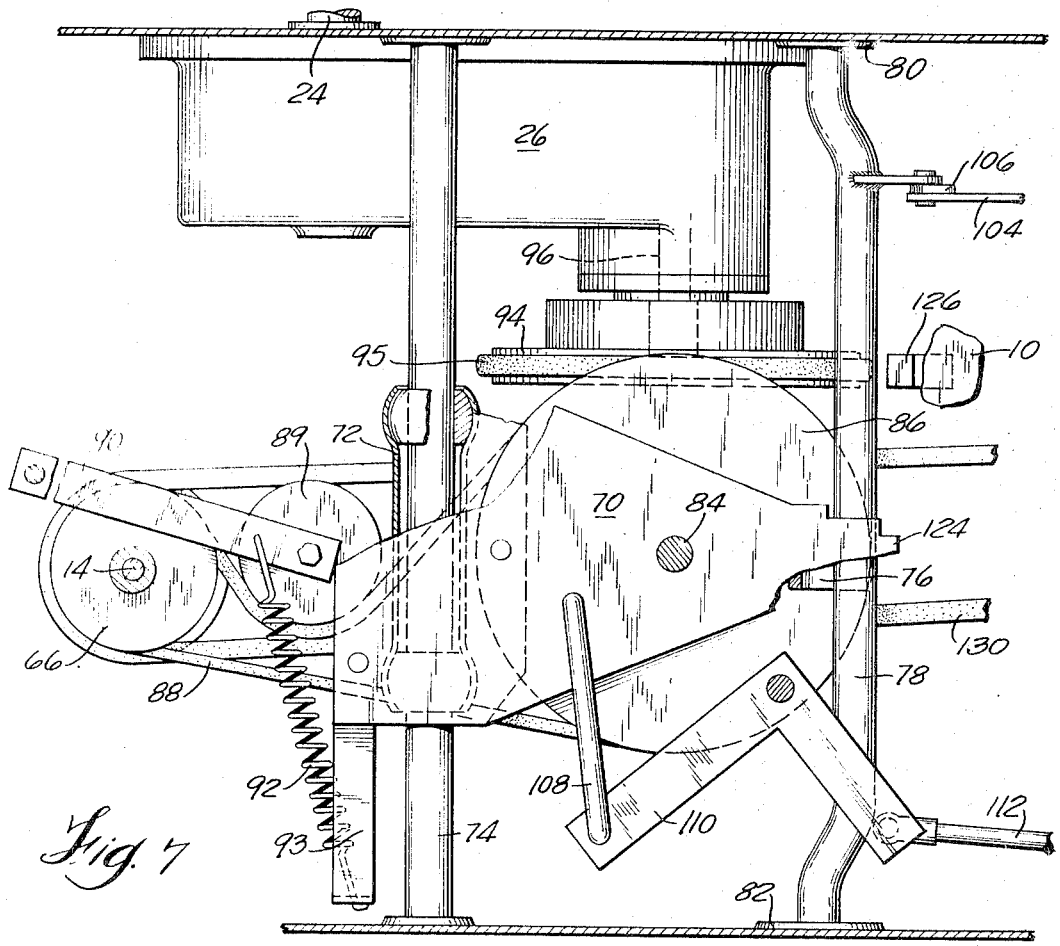
FIG. 7 shows the vehicle speed control mechanism in plan on the line 7—7 in FIG. 2, parts being broken away.
Figure 6:
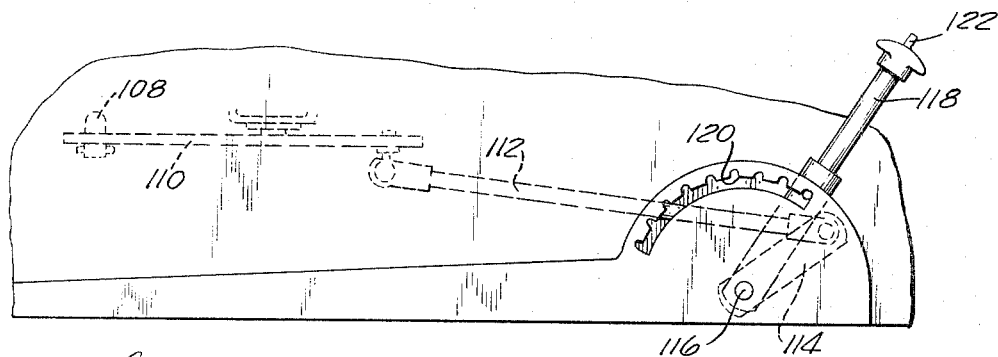
FIG. 6 is a fragmentary detail of vehicle speed control mechanism in side elevation.

The frame 10 has somewhat the form of an inverted channel to provide a housing for the operating parts. The prime mover 12 is only diagrammatically indicated. The drive shaft 14 projects downwardly into the cavity 16 of the frame 10. A casing 18 extends rearwardly over the motor 12. A seat 20 is provided for the operator.

The only rear wheel shown is the drive or bull wheel 22 mounted on a shaft 24 projecting laterally from the frame 10 as shown in FIG. 7. This shaft extends outwardly from the gear casing 26 mounted in the interior of the frame cavity 16 as best shown in FIGS. 2 and 7.

The front wheels 28 and 30 are dirigibly mounted on the L-shaped shafts 32, 34, respectively, these being pivoted on the front axle 36 as best shown in FIG. 2. This front axle is pivoted for oscillation in a vertical plane on the bearing portion 38 of a U-shaped bar 40 rigidly connected with frame 10 near the center thereof. At or near the center line of the vehicle is the inclined steering shaft 44 which has steering wheel 46 on its upper end and is provided near its lower end with a pinion 48 meshing with gear segment 50 (FIG. 4). This segment is connected by link 52 to the dirigible axle 32 of wheel 28. Axle 32 has a tie bar 54 connecting it with the opposite dirigible axle 34 of wheel 30.

Disposed centrally between the front and rear wheels of frame 10 is the inverted pan or mower housing 56 which is provided centrally with a vertical drive shaft 58 for the rotary mower blade 60. The pan 56 is vertically adjustable not only to vary the cut but also to the extent that it may be retracted from operative proximity to the earth. Means for this adjustment will hereinafter be described. The pan is also provided with lateral runners 62 which extend from front to rear in a position to lift the pan over such irregularities in the soil as are indicated at 64 in FIG. 3.

The means for adjustably supporting the pan and the means for driving the supporting vehicle at varying speeds will now be described. Both the vehicle drive and the cutting blade drive are taken from the motor shaft 14 by means of belts trained about the respective drive pulleys 66 and 68.

THE VEHICLE DRIVE

The carriage 70 (FIG. 7) is pivotally and slidably supported by means of the double bearing sleeve 72 which rides upon a bar 74 extending transversely across the interior of frame 10. The forward end of carriage 70 is provided with a slide block 76 which rides upon a cranked shaft 78 rotatably mounted at its ends in bearing 80 and 82 at opposite sides of the frame.

The carriage provides bearing support for the shaft 84 of a driven pulley 86. The belt 88 trained about the driving pulley 66 and about the pulley 86 transmits power to pulley 86, the latter also constituting the driving disk of a friction transmission of infinitely variable rates. A belt tightening pulley 89 is pivotally mounted on an arm 90 subject to the bias of tension spring 92 to hold belt 88 taut. The spring anchorage arm 93 is carried by, and moves with carriage 70. The face of pulley-disk 86 rests upon the non-metallic rim or tire portion 95 of the driven disk 94 which is mounted on the drive shaft 96 of transmission 26 whereby power is imparted to the bull wheel 22.

When the cranked supporting rock shaft 78 is oscillated against the slide block 76 at the front of carriage 70, the driving disk 86 is lifted from contact with the rim 95 of the driven disk 94, thus disengaging the drive to the wheel (or wheels). This serves the function of a clutch. The cranked rock shaft is actuated by clutch pedal 98 at the front of the frame 10, this pedal being connected by link 100 with a slotted slide member 102 providing a lost motion connection with bell crank 104, the latter being in driving connection through link 106 with the cranked rock shaft 78.

Shifting the carriage from side to side to vary the radial position in which the driving disk engages the rim 95 of the driven disk 94 results in a change of speed of the drive to the bull wheel 22. The disk 86, preferably being first disengaged by the described clutch mechanism from the rim, may then be moved laterally of the vehicle be means of link 108, bell crank 110, line 112, rocker arm 114, rock shaft 116 and hand lever 118, the latter being positioned within easy reach of an operator on seat 20 and being provided with a conventional segment 120 and release button 122 which releases a pawl, engageable with segment 120 to maintain the position of adjustment of the change speed mechanism.

The change speed mechanism also effects reverse, this result being brought about by moving the center line of driving disk 86 across the rim 95 of the driven disk 94. To avoid undue wear of the parts, arrangement is made for preventing contact between disks 86 and 94 when the disk is centered over the driven disk. To this end, the carriage 70 has a projecting finger at 124 which has to pass over a fixed abutment 126 on the frame when the disk 86 is in centered position. This prevents disk 86 from being lowered onto disk 94 in that position. It may, however, be lowered when the finger 124 is at either side of stop 126 to effect the transmission of drive either forwardly or in reverse to the bull wheel.

It will be observed that the driving and driven disks are not in conventional arrangement. It is unusual to have the driven disk on a stationary axis and to move the driving disk back and forth across the face of the driven disk. For the purpose of this particular machine, there are considerable advantages in the arrangement described. For one thing, it is desirable to have the disk 94 remain in close proximity to the gear case 26. For another thing, it is quite advantageous, in this particular organization, to have the belt 88 and belt tightener in the same plane in which the disk 86 is reciprocable, whereby the belt can be driven directly without gearing from the drive pulley 66 on the prime mover shaft 14.

DRIVE TO MOWER HEAD

The drive pulley 68 is immediately below the drive pulley 66 on the prime mover shaft 14. Trained about pulley 68 is a belt 130 which is also trained about the pulley 132 on the shaft 58 which carries the mower head 60. While this belt extends downwardly at a slight angle when the mower head is in its lowest position as shown in FIG. 2, this operates satisfactorily. A clutching driving connection between the two pulleys is established or discontinued by bodily movement of the entire pan 56 and the mower head 60 and the pulley 132 forwardly and rearwardly in a direction longitudinally of the frame 10. When the belt is slack, the mower head is idle. When the belt is tight, the mower head is driven.

A major feature of the present invention is the accomplishment of this type of clutching arrangement in a device in which the entire pan and mower head may also be mechanically lifted bodily in horizontal position, or may tilt bodily in passing over ground obstacles, the belt tightening and relaxing mechanism being compatible with the means for independently accommodating these other movements of the pan. These will now be described.

PAN SUPPORT FOR UPWARD AND DOWNWARD TILTING AND FORE AND AFT MOVEMENTS

The clutching fore and aft movement of the pan 56 is effected by link 134 fixed to a standard 136 on the pan and connected at its forward end to a lever 138 (FIG. 3). A link 140 connects this lever 138 with a pin 142 on the arm 144 of rock sleeve 146 with which the clutch lever 148 is connected. This lever has a handle 150 at its upper end. Tension on handle 150 draws the entire pan 56 and cutter head 60 and pulley 132 forwardly to tension belt 130 and thereby to cause motion to be transmitted from the prime mover shaft 14 to the cutter head 60. A segment 151 is engaged by releasable pin 153 to maintain the desired tension on the belt. This conventional arrangement is not specifically shown nor does it need further description.

Release of pin 153 from segment 151 permits the arm 148 to move rearwardly (counterclockwise as shown in FIG. 2) thereby relaxing tension on the drive belt 130 to interrupt the drive to the mower head 60.

The mounting of the pan 56 and mower head is such as to accommodate the fore and aft belt clutching and de-clutching movement just described. At the same time, the mounting accommodates bodily vertical or bodily tilting movement. Support is provided for the pan by lever 160 and bell crank means 161 at one end and bell crank means 162 at its other end. The lever 160 and the bell crank means 161 are both fulcrumed upon pintles which are slidably mounted. The bell crank means 161 has a pintle 164 which is slidable in the bearing channel 166 of the frame. The link 176 connects the two bell crank means 162 and 161 to cause them to oscillate concurrently about their respective pintles 164 and 172 regardless of the location of the pintles 164 and 172 in the fore and aft bearing guides 166, 174 as above described. The bell crank means 161 is primarily actuated and the motion is transmitted therefrom to the bell crank means 162. Motion to lift the front of the pan is transmitted from bell crank 161 to the pan by lever 160 also pivoted on pin 164 and which has a flange 163 in the path of clockwise oscillation of bell crank 161. Actuation is accomplished by a flexible tension member 178 which, as illustrated in FIGS. 2 and 3, is a ball chain wound on a segment 180. This segment is fixed to a rock shaft 182 from which the lever 184 projects upwardly and is provided with a handle 186. The lever 184 carries a pin 154 releasably engaged in segment 152 which is conventional and hence needs no further description or illustration, the sole purpose being to hold the lever 184 in adjusted position to maintain the pan 56 and mower head 60 at its desired elevation.

At the same time, the device can be yieldable from the adjusted position if the runner 62 on the under side of the pan encounters an obstacle such as that shown at 64 in FIG. 3. In such an event, the pan tilts and the tilting is accommodated by the slackening of the flexible tension member 178. When the obstacle has been surmounted, the pan will restore itself by gravity to its original position as determined by the location of lever 184 and pin 154 with reference to segment 152. Flange 163 on lever 160 will be free of bell crank 161 in the elevated pan position shown in FIG. 3 but will re-engage the bell crank to hold the pan in its original position of adjustment when the pan descends after passing the obstruction. Similar freedom of movement of the other end of the pan is accommodated by the lost motion permitted by slot 101 at the end of link 176 (FIG. 2).

It is to be observed that the movements of the pan as controlled by the operator are effected with the pan perfectly horizontal due to the lever 160 and design of the bell crank means 161 and bell crank means 162. It is also to be observed that these same adjustments can be effected regardless of the fore and aft positions to which the fulcrum pins 164 and 172 have been moved in the tightening or release of tension of the drive belt 130. It is also to be observed that the yielding of the pan and mower head does not disturb any of the described settings involving either belt tension or pan height.

We claim:

1. A variable speed friction transmission including a driving disk having a friction face, a driven rotor on an axis normal to that of the disk and having a peripheral rim for receiving motion from said face, a support on which the driving disk is rotatably mounted, said support including a pair of parallel bars, a driving disk bearing platform having slidable and pivotal support from a first of said bars, a second of said bars having an offset portion supporting said bearing platform, means for reciprocating said bearing platform along said first bar whereby to change the ratio of said drive, means to oscillate said second bar to lift the bearing platform and separate the face of the driving disk from the peripheral rim of the rotor to interrupt the drive, and means requiring oscillation of said second bar in order to slide said bearing platform on said first bar through a point where the face of the driving disk will be centered on the periphery of the driven rotor.

2. A transmission according to claim 1 in which the driving disk is a pulley driven by a belt from a power source, and further comprising a belt tightening pulley swingable against said belt and biased toward said belt by biasing means anchored on said bearing support.

* * * * *